(12) United States Patent
Jouper

(10) Patent No.: US 8,295,065 B2
(45) Date of Patent: Oct. 23, 2012

(54) SYSTEM CONTROL BY USE OF PHASE ROTATION SIGNALING

(75) Inventor: Jeffrey A. Jouper, Renton, WA (US)

(73) Assignee: Atronics Advanced Electronic Systems Corp., Redmond, WA (US)

( * ) Notice: Subject to any disclaimer, the term of this patent is extended or adjusted under 35 U.S.C. 154(b) by 477 days.

(21) Appl. No.: 12/459,875

(22) Filed: Jul. 9, 2009

(65) Prior Publication Data

US 2011/0010017 A1     Jan. 13, 2011

(51) Int. Cl.
*H02J 1/10* (2006.01)

(52) U.S. Cl. .......................................... 363/65

(58) Field of Classification Search ............ 363/65; 307/31, 32, 38, 44; 700/295
See application file for complete search history.

(56) References Cited

U.S. PATENT DOCUMENTS

| | | | | |
|---|---|---|---|---|
| 5,384,527 A | * | 1/1995 | Rozman et al. | 322/10 |
| 5,754,445 A | | 5/1998 | Jouper et al. | 700/295 |
| 6,046,513 A | * | 4/2000 | Jouper et al. | 307/31 |
| 6,599,141 B2 | | 7/2003 | Hambley et al. | 439/139 |
| 6,899,390 B2 | * | 5/2005 | Sanfrod et al. | 297/217.4 |
| 7,564,147 B2 | * | 7/2009 | Michalko | 307/44 |
| 7,649,950 B2 | * | 1/2010 | Shen et al. | 375/260 |
| 7,733,039 B2 | * | 6/2010 | Su | 318/139 |

* cited by examiner

*Primary Examiner* — Adolf Berhane
*Assistant Examiner* — Yemane Mehari
(74) *Attorney, Agent, or Firm* — Wiggin and Dana LLP; Gregory S. Rosenblatt

(57) ABSTRACT

A load distribution and management system (LDMS) has a source of multi-phase power and multiple power lines. A separate power line is associated with each phase of power. These power lines connect the power source to a plurality of outlets. A threshold compare circuit is effective to compare power drawn through the plurality of outlets to a preset power limit and signal a phase rotation control if the power drawn exceeds the threshold power. The phase rotation control effective to interchange the power line associated with two of said multi-phases in response to said signal and a rotation detector disables those outlets not in use in response to the interchange of power and power lines. Conversely, when the power drawn is less than the preset threshold power, the phase rotation control returns the power phase to its associated power line signaling the rotation detector to enable disabled outlets. The LDMS is particularly useful where there is a limited supply of power, for example to provide power to passenger laptop computers and personal entertainment devices on a commercial aircraft.

11 Claims, 3 Drawing Sheets

SYSTEM CONTROL BY USE OF PHASE ROTATION SIGNALING

CROSS REFERENCE TO RELATED APPLICATION(S)

N.A.

U.S. GOVERNMENT RIGHTS

N.A.

BACKGROUND OF THE INVENTION

1. Field of the Invention

This invention relates to a system to manage a limited amount of power. More particularly, the availability of power is indicted by a phase sequence of a multiphase power source.

2. Description of the Related Art

There are environments where a limited amount of power is available and the demand for power at time exceeds that available requiring a Load Distribution and Management System (LDMS). For example, the power available to passengers on a commercial aircraft for personal entertainment devices is limited. One LDMS is disclosed in U.S. Pat. No. 5,754,445, titled "Load Distribution and Management System," by Jouper et al. The U.S. Pat. No. 5,754,445 patent is incorporated by reference herein in its entirety.

The U.S. Pat. No. 5,754,445 patent discloses a LDMS where a signal is used to convey whether power is available or power is restricted. When power is available, the signal is in a TRUE state as conveyed from unit to unit by a signal wire with a transmitter at one end of the wire and a receiver at the other end. The wire between the transmitter and receiver is typically of 20 AWG or larger in order to withstand the vibration and environmental stress of the aircraft environment. Because of the length of this conductor and the number of units installed in a system, this single conductor presents a significant weight impact to the overall system.

There remains a need for an LDMS having a reduced weight penalty capable of using existing power and power conductors.

BRIEF SUMMARY OF THE INVENTION

The details of one or more embodiments of the invention are set forth in the accompanying drawings and the description below. Other features, objects and advantages of the invention will be apparent from the description and drawings, and from the claims.

A load distribution and management system (LDMS) has a source of multi-phase power and multiple power lines. A separate power line is associated with each phase of power. These power lines connect the power source to a plurality of outlets. A threshold compare circuit is effective to compare power drawn through the plurality of outlets to a preset power limit and signal a phase rotation control if the power drawn exceeds the threshold power. The phase rotation control is effective to interchange the power line associated with two of the multi-phases in response to the signal and a rotation detector disables those outlets not in use in response to the interchange of power phases and power lines. Conversely, when the power drawn is less than the preset threshold power, the phase rotation control returns the power phase to its associated power line signaling the rotation detector to enable disabled outlets.

The LDMS is particularly useful where there is a limited supply of power, for example to provide power to passenger laptop computers and personal entertainment devices on a commercial aircraft.

BRIEF DESCRIPTION OF THE DRAWINGS

Like reference numbers and designations in the various drawings indicated like elements.

DETAILED DESCRIPTION

A method to signal a limited set of data utilizes changing phase rotation. This method is used to reduce the number of conductors needed in a system requiring multiphase power and signaling. The method is particularly useful with a three phase system having a phase rotation of 120 degree separation. Normal rotation, Phase A, Phase B, Phase C, signals additional power is available. Abnormal rotation Phase A, Phase C, Phase B, signals power is in a restricted mode. When compared to a conventional LDMS as described above, a reduced number, or even no, signaling conductors are required to convey control of the system. As a result, this method can significantly reduce system weight while maintaining power management control and is particularly useful in environments having both power and weight limitations, such as on a commercial or military aircraft.

During normal operation, with power available, phase rotation of A-B-C with 120 degree separation from phase to phase is provided to the system. A phase detector in a load unit monitors for phase rotation with phase A as the reference, and phases B and C monitored based on zero cross timing of each phase. When the power demand reaches a prespecified maximum and power usage needs to be restricted, phase rotation is reversed between phases B and C. The phase detector detects this change in rotation and signals that the system has reached its power limit.

Phase rotation occurs in the head end controller. Head end power on an aircraft is generated by the head end controller which, in one embodiment, takes in 115 VAC 400 Hz power and converts it to 60 Hz three-phase output power. This may be accomplished by a microcontroller or digital signal processor to control output voltage, wave shape, frequency and phase rotation. The phase rotation will be in the enabled state when the power from the system reaches the pre-established threshold and the threshold compare circuit in the head end controller sends a signal to the rotation control in the microcontroller or processor controlling power output. In embodiments where the input power is 60 Hz, rotation control may be accomplished by solid state switching or relay switching by switching the B phase to the C output and the C phase to the B output.

When a load or user connects to the system, outputs from the system are activated only if the phase rotation is in A-B-C. Once the threshold power is reached, activation of the phase rotation will preclude the addition of loads or users while permitting loads and users currently connected to retain power.

Figure 1:
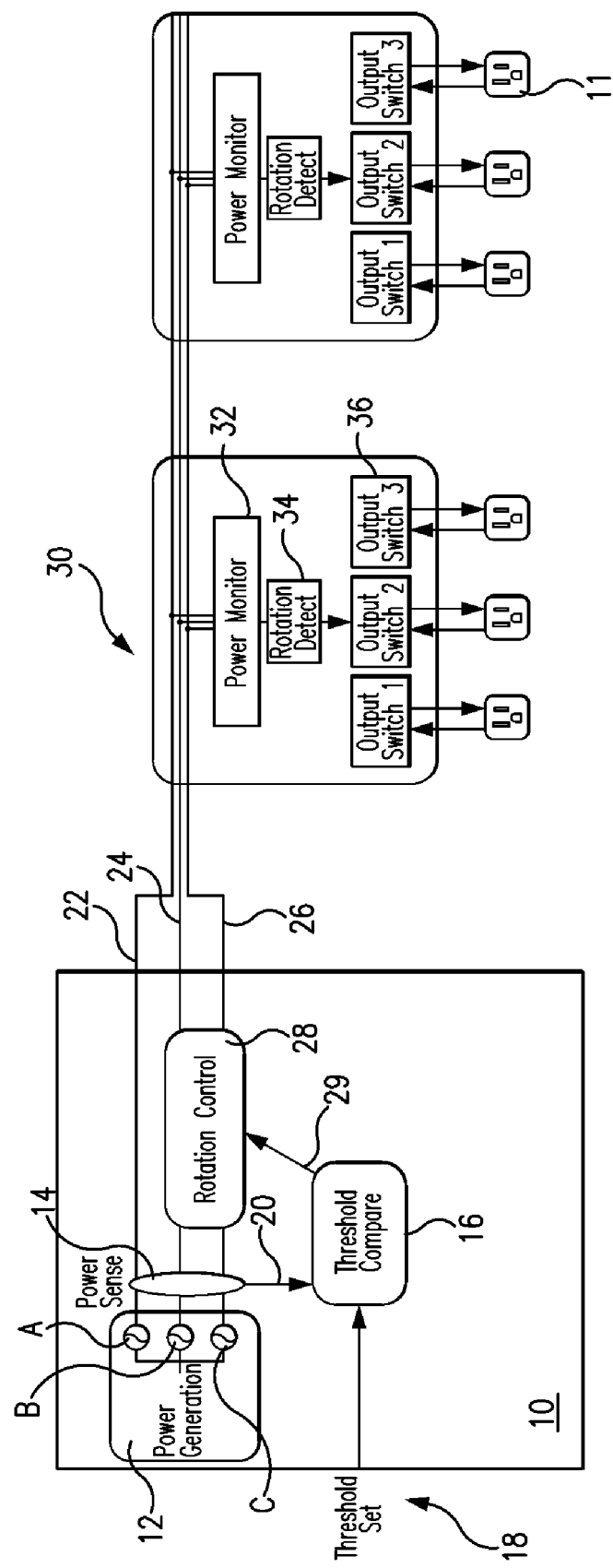
FIG. 1 is a schematic illustrating a head end controller and outputs for an LDMS described herein.

FIG. 1 depicts a schematic of a head end controller 10 and outlets 11 to a LDMS. The outlets 11 may be built into the seat back or arm rest of a passenger seat on a commercial aircraft to enable the passenger to power a personal computer or personal entertainment device. The head end controller 10 includes a power generator 12 which takes in power, such as from a generator driven by an aircraft engine, and creates a multi-phased output. Output from the power generator 12 passes through a power sense circuit 14 which measures the power drawn by measuring the current of the power lines 22, 24, 26 and communicates this to a threshold compare circuit 16. The threshold compare circuit 16 has been preset with a threshold power limit 18 and compares a power drawn signal 20 from the power sense circuit 14 to the threshold power limit 18. If the power drawn equals or exceeds the threshold power limit, the threshold compare circuit 16 generates a signal to activate rotation control 28.

The rotation control 28 takes in the Phase B power from the power generator 12 and the Phase C power from the power generator. It does not take in Phase A power which remains at all times on power line 22. When the threshold compare circuit 16 sends an activation signal 29 to rotate power, the rotation control 28 switches the Phase B power to the Phase C power line 26 and the Phase C power to the Phase B power line 24. This contrasts with operation when additional power is available and the Phase B power is on the Phase B power line 24 and the Phase C power is on the Phase C power line 26.

Power from the Phase A power line 22, Phase B power line 24 and Phase C power line 26 goes to each of a plurality of power units 30. A power unit 30 may be located under a passenger seat and provide power to outlets associated with the seats in the same row, same side of the aisle as the power unit. Inside the power unit 30 is a power monitor 32 which monitors the power coming in and the power drawn through outlets 11 serviced by the power unit 30. If an outlet 11 is not currently drawing power, the rotation detector 34 detects whether the power has been rotated between Phases B and C and, if so, opens the respective output switch 36 disabling a flow of power to that outlet 11.

Figure 2:
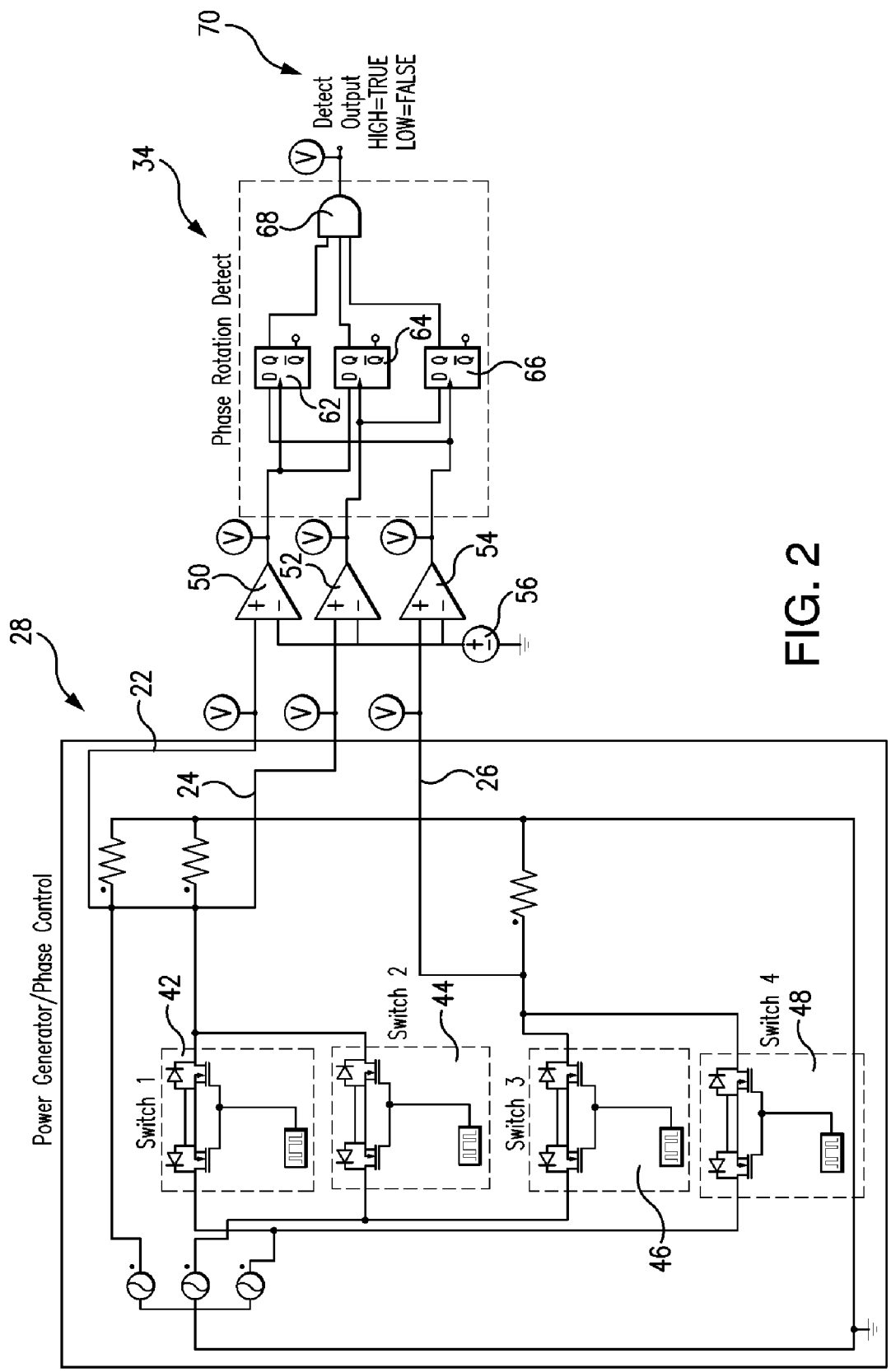
FIG. 2 is a schematic illustrating rotation control and detection for the LDMS of FIG. 1.

FIG. 2 depicts the implementation of the rotation control 28 and its signal to the rotation detectors 34 in the power units. Phase rotation is accomplished by four switches 42, 44, 46, and 48. Exemplary switches are solid state bi-lateral switches. The outputs of the switches are fed via power lines 22, 24, 26 to voltage comparators 50, 52, and 54, which feed into the phase rotation detector 34. The phase rotation detector 34 includes sequentially triggered flip-flops 62, 64, and 66 and an "AND" gate 68. Exemplary flip-flops are D-type flip-flops. When the power is in A-B-C rotation, flip-flops 62, 64 and 66 trigger in sequence placing a high signal at the Q output of each flip-flop and in turn a high signal is placed on the phase rotation detector output 70 enabling the output switches and allowing power to be available at the outlet. Rotation detection is accomplished by the phase rotation of successive phases. Comparators 50, 52 and 54 create a pulse the width of the positive half cycle of the respective input phase. The basic waveform is a logic high from the point the phase voltage is greater than the reference voltage 56. The output of the comparator is fed to the clock on one flip-flop and the D input on the next. Each half cycle is displaced by 120 degrees allowing for a successive clock edge to determine if the proper phase rotation is detected. An example of this is during a positive half cycle of Phase A comparator 50 output rising edge clocks flip-flop 62 and also sets the D input of flip-flop 64 high. Phase B comparator rising edge clocks the D input of flip-flop 64 to the Q output of flip-flop 64. In turn, the Phase B comparator 52 output sets the D input of flip-flop 66 high. Phase C comparator rising edge clocks the D input of flip-flop 66 to the Q output of flip-flop 66. In turn, the Phase C comparator 54 sets the D input of flip-flop 62 high and the next rising edge of Phase A comparator sets the Q output of flip-flop 62 high. When rotation control is activated, switches 42 and 46 are on and switches 44 and 48 are off, the phase displacement between the three phases is now reversed and the comparator timing to the phase rotation detector is reversed and the Q outputs of the flip-flops 62, 64, 66 are set low as well as the AND gate 68.

Outlets in use are not disabled when the phase rotation is detected. When use of an outlet is terminated, that outlet is then disabled until phase rotation control is removed. When the power demand drops below the present power threshold, the phase rotation is reversed and B phase power is returned to power line 24 and C phase power is returned to power line 26.

Figures 3A, 3B, 3C, 3D, 3E:
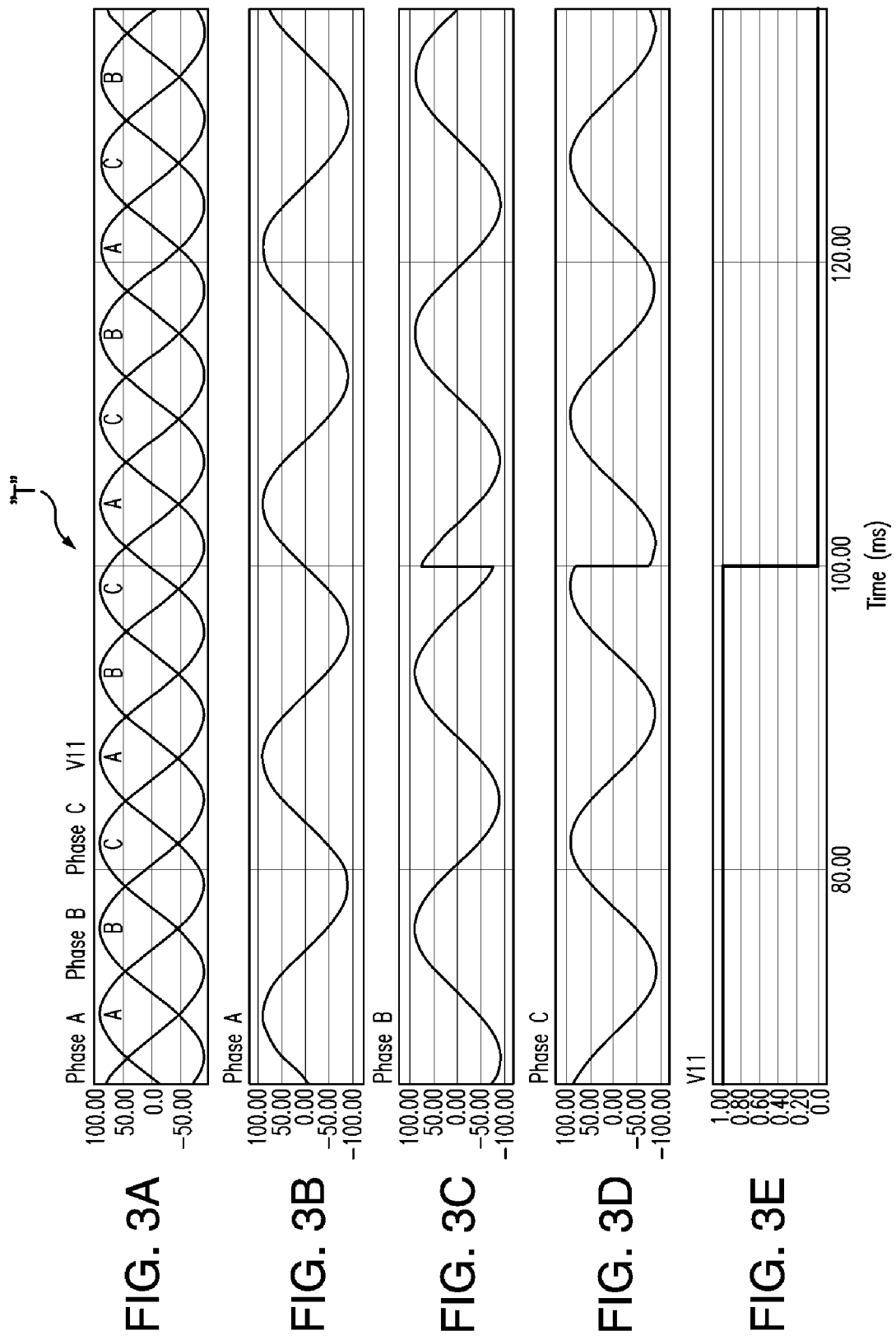
FIG. 3 illustrates waveforms of a power signal before and after phase rotation.

FIG. 3 depicts the power signal before and after phase rotation. The horizontal axis is time, in milliseconds, and the vertical axis is voltage, in volts. A phase rotation occurs at time "T". As illustrated in 3A, output power is uninterrupted by the phase rotation for loads connected to the system. The signal of the Phase A output 3B does not change. The signal of the Phase B output 3C shifts 120 degrees as C power is applied to the Phase B output. The signal of the Phase C output 3D shifts 240 degrees as Phase B power is applied to the Phase C output. The rotation detector senses the phase shift 3E and outputs not connected to the system are disabled.

One or more embodiments of the present invention have been described. Nevertheless, it will be understood that various modifications may be made without departing from the spirit and scope of the invention. Accordingly, other embodiments are within the scope of the following claims.

What is claimed is:

1. A load distribution and management system (LDMS), comprising:
   a single source of multi-phase power;
   multiple power lines, one associated with each respective phase of said multi-phase power, interconnecting said single source with a plurality of outlets;
   a threshold compare circuit effective to compare power drawn through said plurality of outlets to a preset power limit and signal a phase rotation control if said power drawn exceeds said threshold power;
   said phase rotation control effective to interchange the power line associated with two of said multi-phases in response to said signal; and
   a rotation detector that disables ones of said plurality of outlets not in use in response to an interchange of said power lines.

2. The LDMS of claim 1 wherein said multi-phase power consists of three phases, each separated from the other two by a 120-degree phase difference.

3. The LDMS of claim 2 wherein said source of multi-phase power is a generator driven by an aircraft engine.

4. The LDMS of claim 2 wherein each of said three phases, A, B, C, is conducted over a separate power line, respectively AL, BL, CL when said power drawn is less than said threshold power.

5. The LDMS of claim 4 wherein each of said three phases, A, B, C, is conducted over a separate power line, respectively AL, CL, BL when said power drawn is equal to or exceeds said threshold power.

6. The LDMS of claim 5 wherein a plurality of switches are effective to switch said B phase from power line BL to power line CL and said C phase from power line CL to power line BL in response to said signal from said threshold compare circuit.

7. A method to manage a load distribution comprising the steps of:
   providing, from a single power generator, multi-phase power having at least three phases, A, B, C over separate power lines, respectively AL, BL and CL from a power source to a plurality of outlets;

comparing the total power conducted through said outlets to a preset threshold power; and transferring said B phase to said CL power line and said C phase to said BL power line if said total power is equal to or exceeds said preset threshold power.

8. The method of claim 7 including disabling outlets not in use if a phase rotation is detected.

9. The method of claim 8 wherein said multi-phase power has three phases generated by a generator driven by an aircraft engine.

10. The method of claim 8 wherein said B phase is returned to said BL power line and said C phase is returned to said CL line when said total power is less than said preset threshold line and disabled outlets are enabled when reverse phase rotation is detected.

11. The method of claim 9 wherein a group of said outlets are provided power through a common power unit mounted under a seat of said aircraft.

* * * * *